(12) United States Patent
Nishimura

(10) Patent No.: US 8,923,332 B2
(45) Date of Patent: Dec. 30, 2014

(54) WIRELESS COMMUNICATION NETWORK SYSTEM

(75) Inventor: Tomotsune Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 13/698,077

(22) PCT Filed: May 13, 2011

(86) PCT No.: PCT/JP2011/061595
§ 371 (c)(1),
(2), (4) Date: Nov. 15, 2012

(87) PCT Pub. No.: WO2011/145708
PCT Pub. Date: Nov. 24, 2011

(65) Prior Publication Data
US 2013/0070654 A1    Mar. 21, 2013

(30) Foreign Application Priority Data

May 21, 2010   (JP) ................................. 2010-117095

(51) Int. Cl.
| | | |
|---|---|---|
| *H04W 40/12* | (2009.01) | |
| *H04L 12/729* | (2013.01) | |
| *H04L 12/707* | (2013.01) | |
| *H04W 28/18* | (2009.01) | |
| *H04W 76/04* | (2009.01) | |

(52) U.S. Cl.
CPC .............. *H04W 40/12* (2013.01); *H04L 45/125* (2013.01); *H04L 45/22* (2013.01); *H04W 28/18* (2013.01); *H04W 76/041* (2013.01)
USPC ........................................ 370/468; 455/452.2

(58) Field of Classification Search
USPC ......... 370/229, 230, 235, 329, 464, 465, 468; 455/450–452.2
See application file for complete search history.

(56) References Cited

U.S. PATENT DOCUMENTS

| | | | | |
|---|---|---|---|---|
| 6,748,220 | B1 * | 6/2004 | Chow et al. ................... | 455/450 |
| 8,351,453 | B2 * | 1/2013 | Park et al. ..................... | 370/431 |
| 2003/0161338 | A1 * | 8/2003 | Ng et al. ....................... | 370/437 |

FOREIGN PATENT DOCUMENTS

| | | |
|---|---|---|
| CN | 101048012 A | 10/2007 |
| CN | 101119301 A | 2/2008 |
| CN | 101645797 A | 2/2010 |
| EP | 2026517 A1 | 2/2009 |
| JP | 2004-032393 A | 1/2004 |

(Continued)

OTHER PUBLICATIONS

Jun Nishioka, et al., "A Study on Routing over AMC-enabled FWA Mesh Network", IEICE Technical Report, NS2008-134, Jan. 15, 2009, pp. 49-54, vol. 108, No. 392.

(Continued)

*Primary Examiner* — Kerri Rose
(74) *Attorney, Agent, or Firm* — Sughrue Mion, PLLC

(57) ABSTRACT

In a wireless communication network system and on a route of a network which is being used for communication, in case a fall of transmission rate occurs depending on AMR, there is an inconvenience that, even though there exists another route with faster transmission rate, switching to it cannot be made.

The route selection method of the present invention is a route selection method in a communication network using a microwave communication system, and depending on the changes in transmission capacity of each route of the network, a route with larger transmission capacity is selected as the route to communicate.

6 Claims, 9 Drawing Sheets

(56) References Cited

FOREIGN PATENT DOCUMENTS

| JP | 2006-332988 A | 12/2006 |
|---|---|---|
| JP | 2007-258865 A | 10/2007 |
| JP | 2007-266702 A | 10/2007 |
| JP | 2009-267881 A | 11/2009 |
| WO | 2010/016477 A1 | 2/2010 |

OTHER PUBLICATIONS

Extended European Search Report dated Oct. 10, 2014, issued by the European Patent Office in counterpart European application No. 11783642.9.

J. Sangiamwong et al., "Link Quality-Based Path Selection Scheme in Millimeter-Wave Broadband Entrance Network for Wireless Heterogeneous Systems", IEICE Transactions on Communications, Communications Society, Tokyo, Japan, vol. E87-B, No. 5, May 1, 2004, 8 total pages, XP001217938.

J. Sangiamwong et al., "Dynamic Resource Assignment Scheme in Mesh-Topology Millimeter-Wave Broadband Entrance Networks", IEICE Transactions on Fundamentals of Electronics, Communications and Computer Sciences, Engineering Sciences Society, Tokyo, Japan, vol. E87-A, No. 10, Oct. 1, 2004, 8 total pages, XP001210466.

J. Nishioka et al., "Link Estimation Methods for Routing over FWA Mesh Network", Wireless Communications and Networking Conference, 2009. WCNC 2009. IEEE, IEEE, Piscataway, NJ, USA, Apr. 5, 2009, 6 total pages, XP031454277.

Chinese Office Action, Application No. 201180025263.2; Sep. 28, 2014.

\* cited by examiner

Fig.3

| Transmission Capacity/Throughput(Mbps) | | | | |
|---|---|---|---|---|
| Modulation \ CS* | Mode 1<br>7 MHz | Mode 2<br>14 MHz | Mode 3<br>28 (27.5) MHz | Mode 4<br>56 (55) MHz |
| QPSK | 11 | 26 | 53 | 110 |
| 16QAM | 26 | 53 | 110 | 220 |
| 32QAM | – | 66 | 136 | 273 |
| 128QAM | – | 94 | 189 | 388 |
| 256QAM | – | – | 220 | 441 |

\* : Channel Separation

– : Not Available

WIRELESS COMMUNICATION NETWORK SYSTEM

CROSS REFERENCE TO RELATED APPLICATIONS

This application is a National Stage of International Application No. PCT/JP2011/061595 filed May 13, 2011, claiming priority based on Japanese Patent Application No. 2010/117095, filed May 21, 2010, the contents of all of which are incorporated herein by reference in their entirety.

TECHNICAL FIELD

The present invention relates to route control using AMR (Adaptive Modulation Radio) control of a wireless communication system in a wireless communication network system.

BACKGROUND ART

A communication network using a wireless communication system and most especially, a wireless communication network including a small microwave communication system of Point to Point is drawing attention as a means to complement an optical communication circuit or a wireless trunk line circuit. This kind of wireless communication network has wide use such as substitution or backup of a cellular phone network, communication between buildings and an optical communication network. Recently, as a communication system which links base stations in a mobile telephone network market which rapidly expands worldwide, its demand is growing greatly due to the characteristics such as cost performance of a device, easiness of construction, flexibility of system change and large capacity. As the demand of increase in high-speed and broadband for such communication grows, supply of cheaper and high-quality circuit service is being asked for. Also, with growing complexities of recent years' mobile network, reduction of operator's CAPEX (Capital Expenditure)/OPEX (Operating Expense) is required, and economization of a communication device and increase in efficiency of a network are required. Therefore, the technology which performs efficient route selection and the technology which performs circuit switching at the time of failure are essential and important. In a monitoring and control circuit which connects an NMS (Network Management System) which controls a network and an NE (Network Element), it is necessary to perform switching/route change flexibly/dynamically.

Among microwave communication systems, there is one which includes a function called AMR (Adaptive Modulation Radio). This AMR is the function to switch a transmission modulation method automatically according to the circuit condition of the wireless. By using this, in case the circuit condition is bad, using a transmission modulation method with low transmission rate, it is switched to the condition which raises reliability, and in case the circuit condition is good, using a transmission modulation method with high transmission rate, it is switched to the condition which secures communication capacity. The AMR function realizes modulation method switching hitless by judging at a receiving end, feeding back a modulation method which seemed most suitable to a sending end, and changing the modulation method successively from the sending end in units of a wireless frame.

It is effective to correspond to such dynamic changes in circuit transmission capacity, and to realize the function of monitoring and control circuit switching/route change between NMS-NE dynamically. However, route selection in the wireless communication network system which is a related technology is dependent on an existing routing protocol.

As a representative one of the existing routing protocols, for example, there is an RIP (Routing Information Protocol) of distance vector type. The RIP is a routing protocol which, in a communication network including a plurality of routers, and based on the number of hops (the number of routers to go through to reach the network), selects a route having the smallest numbers of hops. Each router sends a routing table (a correspondence table which shows a packet addressed to a certain network is transferred to which network next) which itself hold to a neighboring router. In the table, metrics for each network is indicated. The metrics is a numerical value which indicates a distance to the destination, and in case of the RIP, the number of hops to reach the network which is a target is used. The router which received the routing table adds, in case there is a network which itself did not know in the table, the network to the routing table which itself hold. Also, even in case itself knows the metrics, in case it is short, the information is added to the routing table of itself. By each router performing this operation, as the network as a whole, each router will hold the routing table by which it can be reached with the smallest number of hops.

Also, as a protocol which improved the RIP, there is an OSPF (Open Shortest Path First). While the RIP is a distance vector type, the OSPF is called a link state type. As one of the points which the OSPF is different from the RIP, there is a point that not the number of hops but "cost" of a network is used as the metrics. The cost is calculated based on a bandwidth of a circuit between two routers, and the cost value is defined to become smaller as the bandwidth becomes larger. By using this cost value, and by calculating the metric value which is a numerical value which becomes a standard for selecting the route from an original sending source to a destination, selection is made. Accordingly, in this case, a route with the low metric value will be the route which should be selected because its bandwidth is large.

In a relay network (communication network) including a plurality of relay stations and described in the following patent document 1, the main station searches relay routes of data from a sending source to a receiving destination, and determines the optimum route. By performing adaptive multistage relay using the determined route, good relay transmission is realized. As the standard of the optimum route search, either of a route where the total of the reciprocal of a CNR (Carrier to Noise Ratio) of each link is smallest or a route where the total of a BER (Bit Error Rate) of each link is smallest is used. Further, as the standard of the optimum route search, a route where the total of the packet loss ratio is smallest and a route where the number of relay stages is smallest are also used.

THE PRECEDING TECHNICAL LITERATURE

Patent Document

[Patent document 1] Japanese Patent Application Laid-Open No. 2004-32393

[Patent document 2] Japanese Patent Application Laid-Open No. 2006-332988

[Patent document 3] Japanese Patent Application Laid-Open No. 2007-258865

[Patent document 4] Japanese Patent Application Laid-Open No. 2007-266702

[Patent document 5] Japanese Patent Application Laid-Open No. 2009-267881

SUMMARY OF INVENTION

Technical Problem

Although the technology of the patent document 1 mentioned above is a technology which selects a better route in a communication network, its index mainly adopts communication quality. For example, in case an error rate is used as the index, an optimum route where the error rate becomes smallest will be selected from a plurality of relay routes. However, the technology of the patent document 1 mentioned above does not consider transmission rate. Therefore, even if the error rate is smallest, the transmission rate may not be fast. Accordingly, there was an inconvenience that, even though there is a route with higher transmission rate, a route with very low transmission rate will be selected as the route between NE's (Network Elements) by the reason that the error rate is smallest.

In a wireless communication network system using the method based on the existing routing protocol which is the related technology mentioned above, the method to select a route does not perform efficient route selection based on change in the wireless transmission capacity dynamically. For example, although a numerical value based on a bandwidth is being used as a cost in the OSPF mentioned above, a numerical value determined by the specification of the interface card is set in advance to this bandwidth fixedly at the time of network opening. Accordingly, on the route of the network which is being used for communication, even if a fall of a transmission rate occurs depending on the AMR, changes in its transmission rate is not considered by the existing routing protocol. Accordingly, there was an inconvenience that, even if there is other route with faster transmission rate, switching to it can not be done.

Object of the Invention

The object of the present invention is to provide a wireless communication network system which can avoid the inconveniences mentioned above. That is, a wireless communication network system which can perform circuit switching and route change dynamically based on a change in the wireless transmission capacity depending on the AMR control of a wireless communication system, and which can select an economical and efficient route in the wireless communication network is provided.

Solution to Problem

The route selection method of the present invention is a route selection method in a communication network using a microwave communication system selects a route with larger transmission capacity among a plurality of routes of said communication network.

Also, the wireless communication device of the present invention is a wireless communication device used for a communication network using a microwave communication system selects a route with larger transmission capacity among a plurality of routes of said communication network.

Advantageous Effects of Invention

As has been described above, in the wireless communication network system of the present invention, there are the following effect. That is, circuit switching and route change are performed dynamically based on a change in the wireless transmission capacity depending on the AMR control of the wireless communication system, and an economical and efficient route is selected in the wireless communication network. As a result, the wireless communication network system which can select a transmission route with high transmission efficiency can be provided.

DESCRIPTION OF EXEMPLARY EMBODIMENT

The First Exemplary Embodiment

The first exemplary embodiment of the present invention will be described with reference to drawings.

Figure 1:
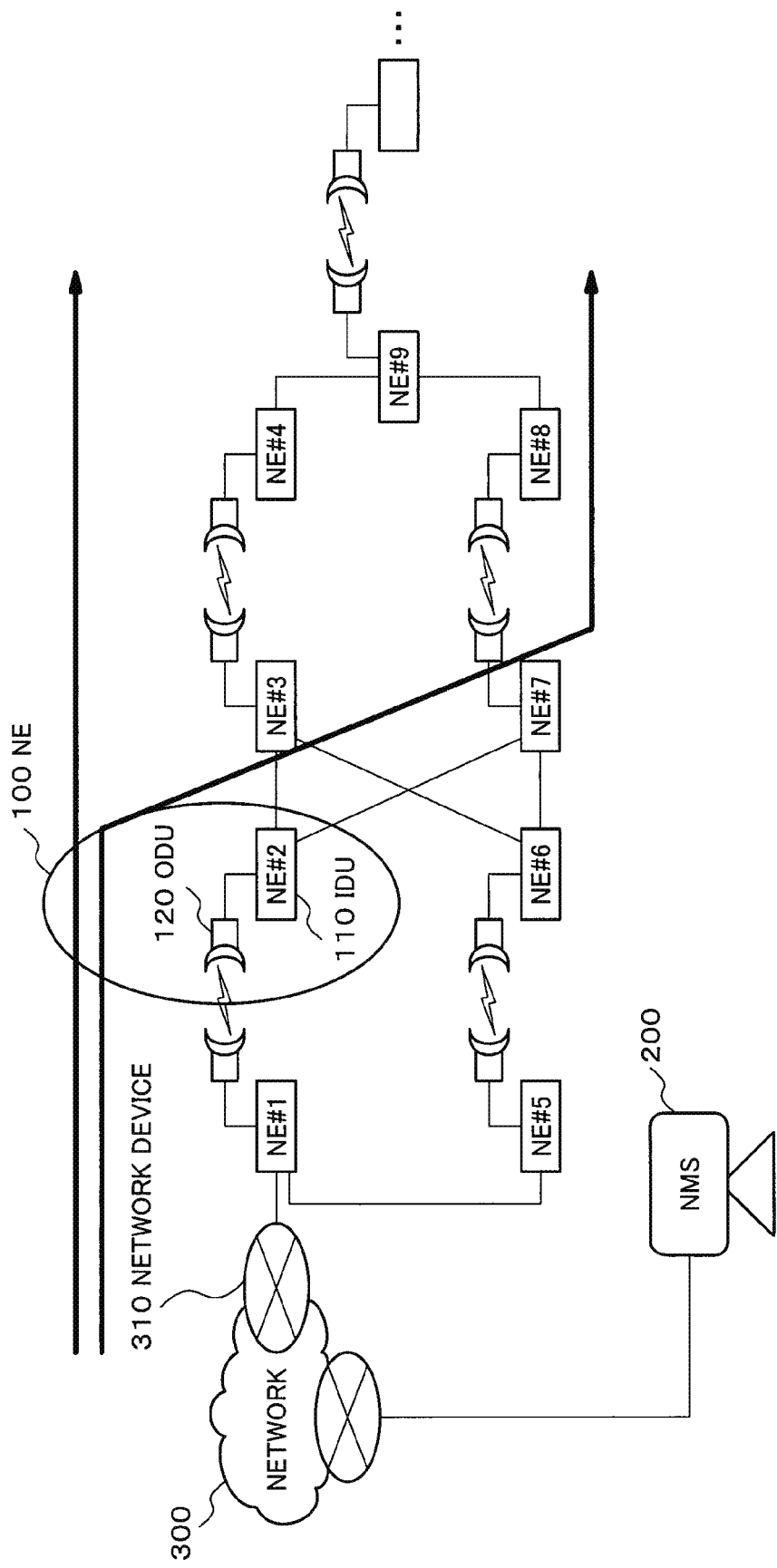
FIG. 1 A block diagram of a microwave communication system according to an exemplary embodiment of the present invention FIG. 2 A block diagram of a mobile communication system according to the same exemplary embodiment FIG. 3 An example of operation of AMR transmission capacity according to the same exemplary embodiment FIG. 4 A conceptual diagram of AMR transmission capacity change according to the same exemplary embodiment FIG. 5 AMR modulation method switching procedure according to the same exemplary embodiment FIG. 6 Connection sequence between NMS-NE according to the same exemplary embodiment FIG. 7 Route change sequence between NMS-NE according to the same exemplary embodiment FIG. 8 Routing process flow chart of NE according to the same exemplary embodiment FIG. 9 A block diagram of a wireless communication device according to an exemplary embodiment of the present invention

FIG. 1 is a block diagram of a microwave wireless communication network system according to the exemplary embodiment of the present invention. In this embodiment, in particular, an example of a structure in which each NE is managed by a connection from an NMS to each NE is indicated. That is, an example of a structure in which each NE is managed by the NMS is indicated.

An NE (Network Element) 100 of the microwave communication system includes an IDU (Indoor Unit) 110 and an ODU (Outdoor Unit) 120, and a distributor/coupler (HYB) and an antenna which are not shown. Further, as for the NE (Network Element) 100 of the microwave communication system, via a network 300 and by an NMS (Network Management System) 200, monitoring and control of the NE is performed. The ODU 120 sends and receives by wireless modulation and demodulation, and the IDU 110 processes mainly a baseband signal and realizes transmission with other NE's. Further, as for the NE (Network Element) 100 of the microwave communication system, the NE 100 and the NMS 200 are connected via a network device 310.

Figure 2:
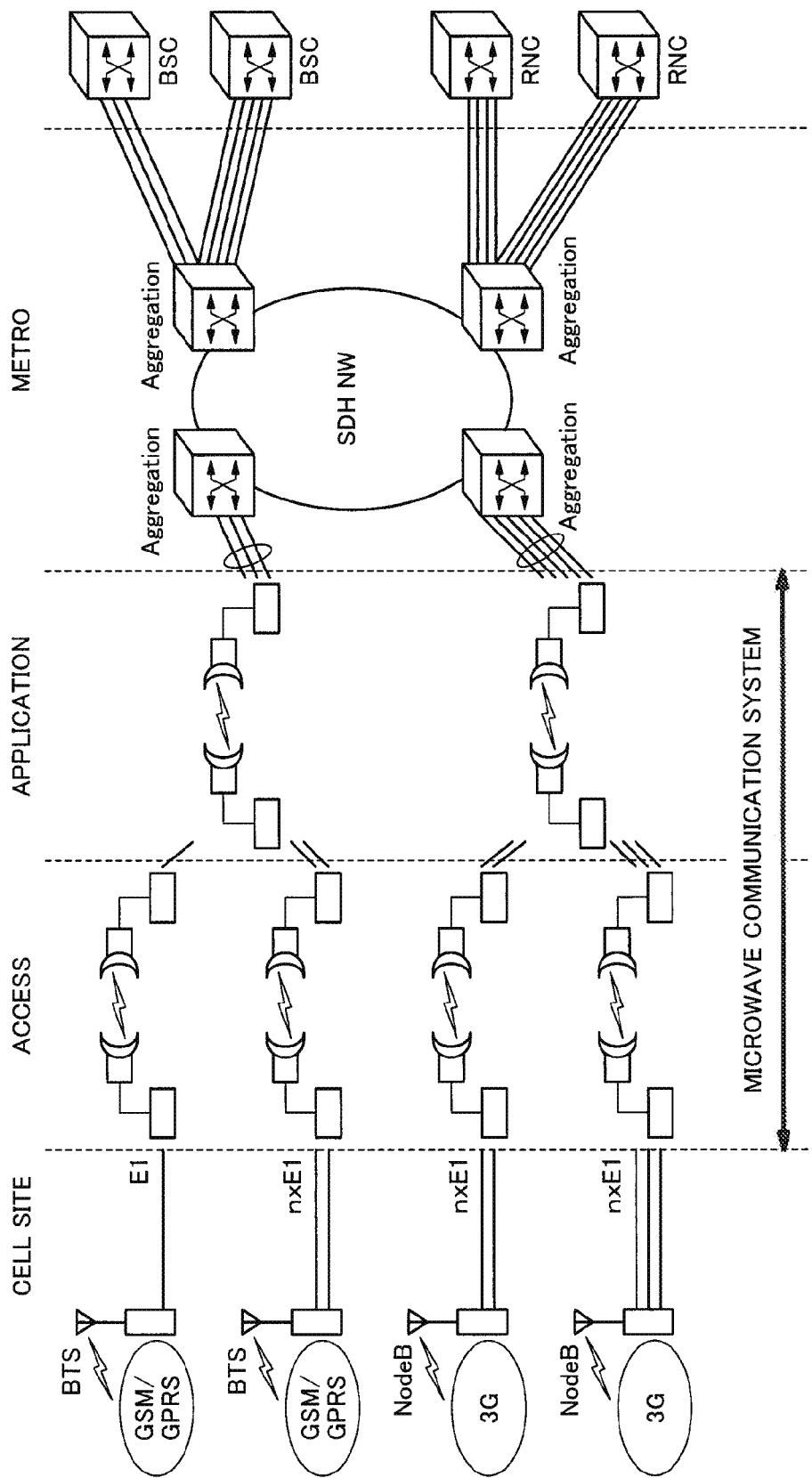

In FIG. 2, a structure of a mobile communication system according to the exemplary embodiment of the present invention is shown. The mobile communication system includes a BTS (Base Transceiver Station)/Node B, a BSC (Base Station Controller), an RNC (Radio Network Controller) and so on. With expansion of a recent IP (Internet Protocol) network, a backbone network of a mobile communication is also advancing towards IP. The microwave communication system complements an optical communication circuit and a wireless trunk line circuit, and possesses a function to access a transmission line, an aggregation function and so on. Further, FIG. 1 corresponds to a part of the microwave communication system of FIG. 2.

Figure 4:
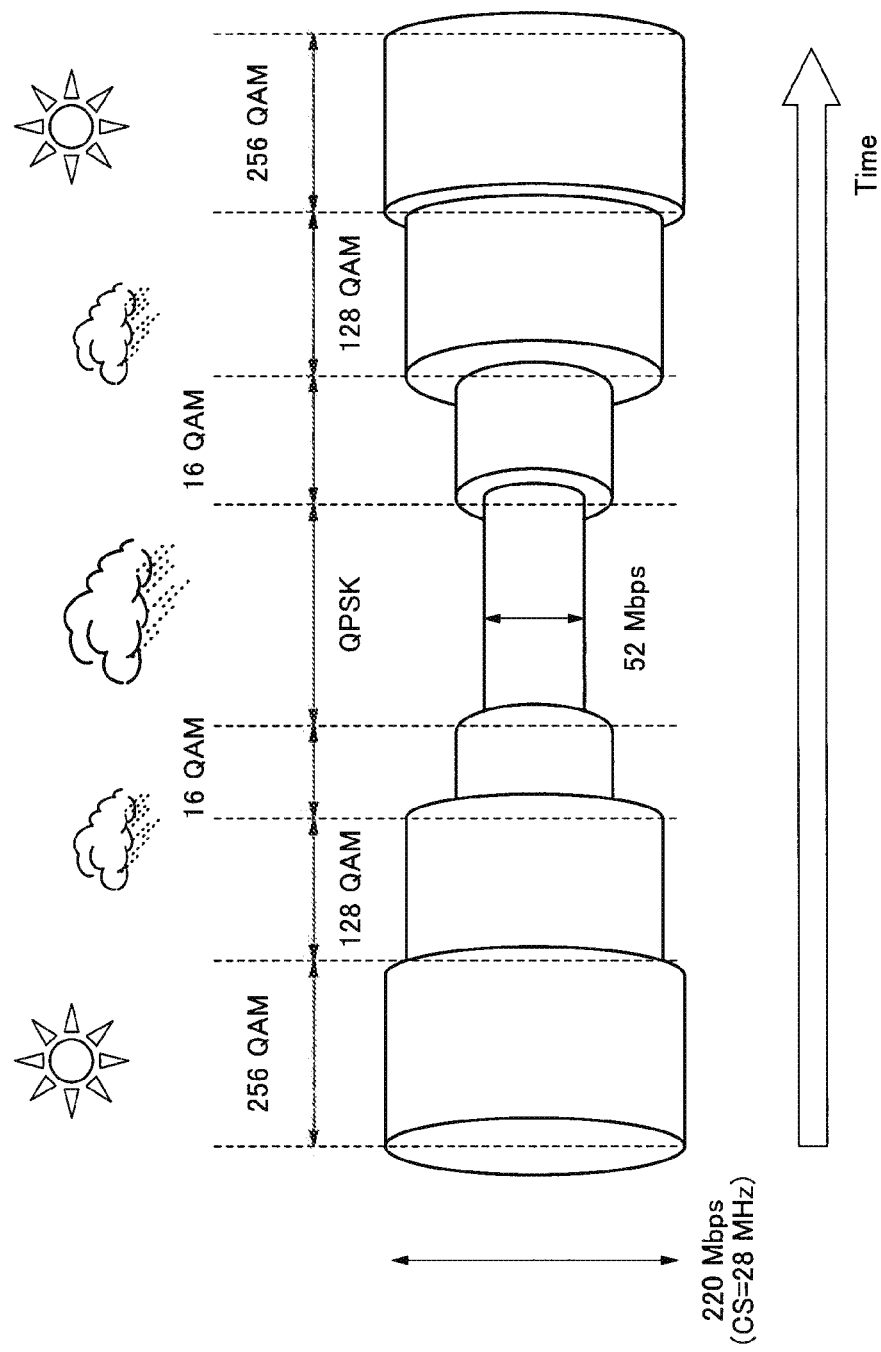

In FIG. 3, an example of AMR transmission capacity according to the exemplary embodiment of the present invention, and in FIG. 4, a conceptual diagram of AMR transmission capacity change is shown. A table of FIG. 3 is a correspondence table depending on the AMR (Adaptive Modulation Radio) function among a bandwidth (CS: Channel Separation) of a wireless circuit, a modulation method and a transmission rate. For example, in case CS=Mode 2 (14 MHz) and the modulation method is 16QAM, it shows that the transmission rate of 53 Mbps is obtained. FIG. 4 shows a situation that, depending on the AMR function, and by changing the modulation method of the wireless circuit dynamically depending on a change of weather conditions of a wireless transmission segment, the transmission capacity of the wireless segment is optimized. In FIG. 4, at first (left side of the time axis), when a wireless segment is in an environment where the weather is fine and such as CNR is also good, high transmission capacity is secured by using a modulation method with high-speed transmission rate (in the example, 256QAM). After that, in case the weather worsened gradually, and because of a fall of the CNR due to influences of rainfall, occurrence of fading (fading) and so on, an error rate becomes high and actual throughput (data transfer volume per unit time) falls for 256QAM, it operate as follows. That is, by using a modulation method with low transmission rate but with high error tolerance (in the example, from 256QAM, changed to 128QAM→16QAM→QPSK), the most suitable transmission capacity for that environment has been secured. After that, as the weather improves, it is restored from the modulation method with low transmission rate (high error tolerance) to the modulation method with high transmission rate in the early stage.

Figure 5:
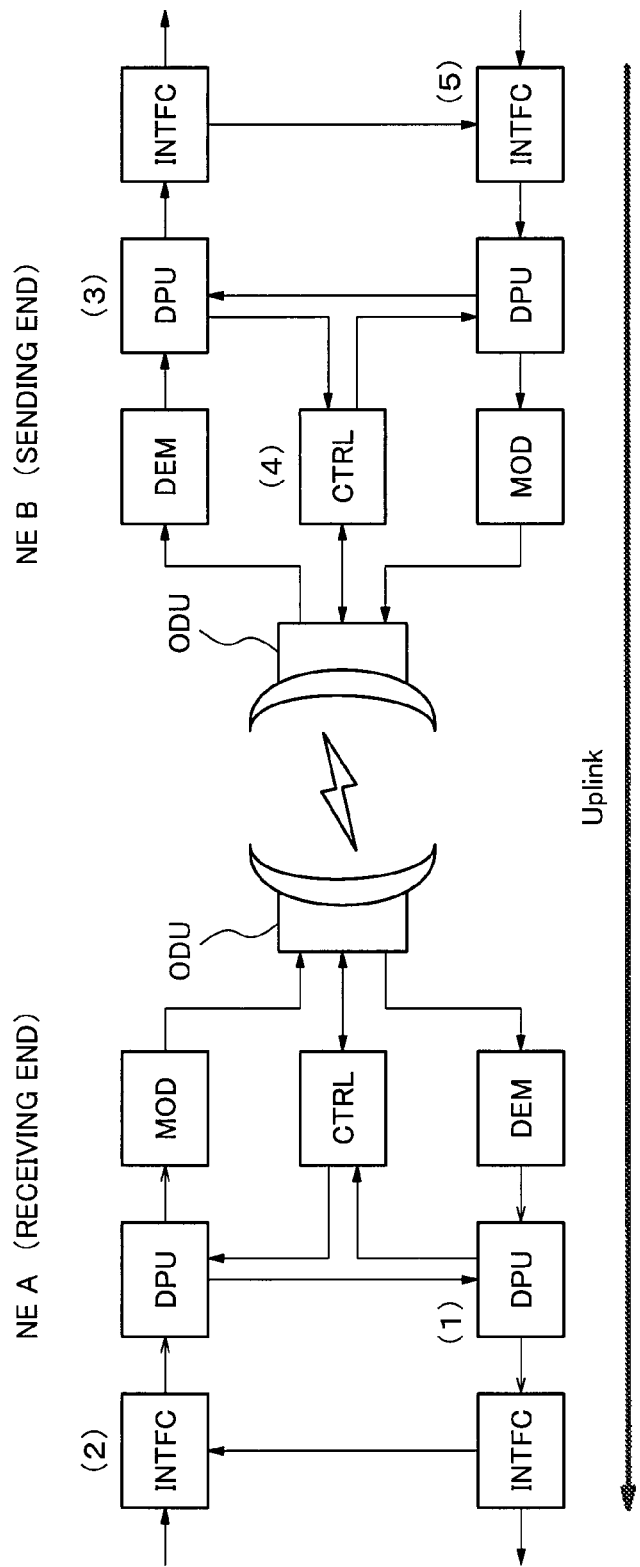

In FIG. 5, a structure of the microwave communication system according to the exemplary embodiment of the present invention is shown. Numbers of (1)-(5) written in the figure are used when AMR modulation method switching procedure is described in the following. FIG. 5 includes opposing NE A (receiving end) and NE B (sending end). Each NE includes: an INTFC (Interface Unit), a DPU (Digital Processor Unit), an MOD (Modulator Unit), a DEM (Demodulator Unit), a CTRL (Control Unit) and an ODU (Out Door Unit). The INTFC is connected with an external wired circuit, and possesses a function to send and receive a signal and a function which multiplexes information judged by the AMR and propagates it to the opposing NE. The DPU possesses a function of channel coding (decoding) for wireless transmission and as the AMR function, a function to judge the most suitable modulation method from the received signal. The MOD performs wireless modulation and the DEM performs wireless demodulation. The CTRL (Control Unit) possesses functions to perform various controls in the system, to send and receive a control signal and so on. On the ODU (Out Door Unit), such as a send and receive amplifier is mounted, and it is installed outdoors mainly.

The AMR function realizes modulation method switching hitless (without involving outage) by feeding back a modulation method judged based on a received signal at a receiving end to a sending end, and by changing the modulation method successively from the sending end in units of a wireless frame. The modulation method of Uplink/Downlink is controlled independently respectively. In FIG. 5, only processing about modulation method switching in Uplink is described. AMR procedure is carried out by the following (1)-(5).

(1) On the receiving end DPU of the NE A, based on the received signal from the NE B, the most suitable modulation method which should be switched next is judged.

(2) Multiplex the modulation method information judged by (1) to the sending frame at the receiving end INTFC, and transmit it to the opposing NE (NE B) by a wireless signal via the MOD and so on.

(3) At the NE B, the transmitted modulation method information is extracted at the sending end DPU and notifies it to the CTRL.

(4) The sending end CTRL changes the modulation method setting of the ODU of the NE B and returns a ACK (Acknowledgement) signal.

(5) The modulation method of the sending end is switched after the ACK is received from the CTRL at the sending end INTFC.

Further, as information which becomes a base of judgment of the modulation method, a CNR (Carrier to Noise Ratio), an RSL (Received Signal Level), a Syndrome error and so on are used.

In case three types mentioned above are used, by using the CNR as the main judgment information and by using the Syndrome and the RSL as the supplementary information, accuracy improvement of the judgment becomes possible.

Operation of the first exemplary embodiment of the present invention will be described with reference to drawings.

Figure 6:
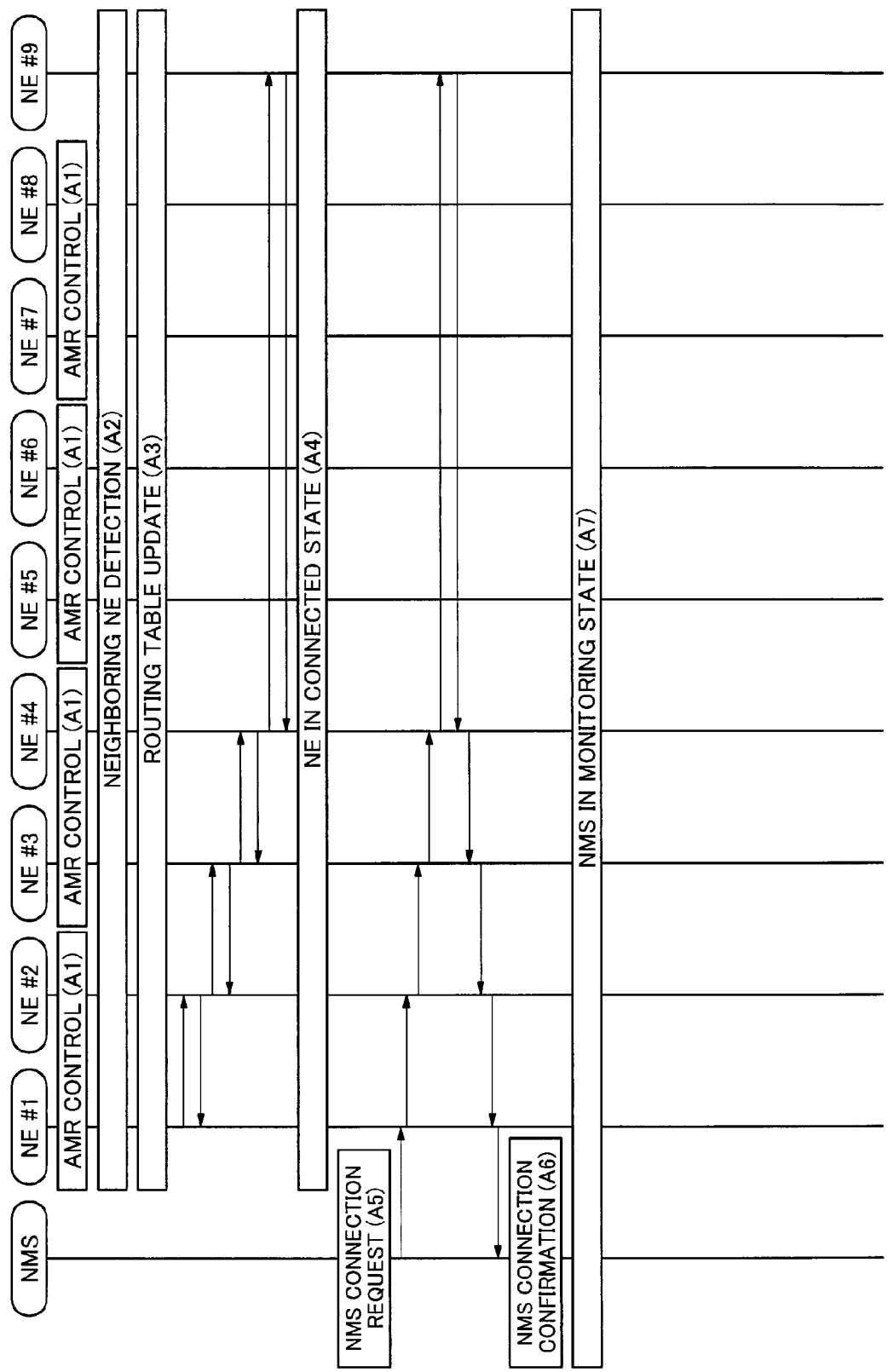

FIG. 6 is a connection sequence between NMS-NE according to the first exemplary embodiment of the present invention. Explanation will be made with reference to the exemplary configuration of FIG. 1. A routing protocol of the network according to the first exemplary embodiment of the present invention is a link state type which uses cost of the network (routing cost) as the metrics. Each NE performs the AMR control between opposing wireless NE's, and after fixing the wireless transmission capacity between the opposing NE's, calculates the routing cost of each wireless port of the NE (Step A1). This routing cost is calculated based on the wireless transmission capacity between the opposing NE's. For example, the cost value may be determined so that it may be proportional to a reciprocal of the wireless transmission capacity (bit/s). Each NE detects an IP address of neighboring NE's connected to a wireless/wired port, calculates the metrics based on the costs that are calculated and creates a routing table (Step A2). After exchanging route information based on the routing table between each NE (Step A3), a connection between NE's is established (Step A4). After that, each NE which received a connection request from the NMS 200 refers to the routing table, performs route selection (Step A5) and establishes the connection with the NMS 200 (Step A6). In the example of FIG. 6, it is shown that the route which is selected and established is in the order of NE#1, NE#2, NE#3, NE#4 and NE#9.

Accompanied by connection establishment from the NMS to each NE, monitoring control becomes possible (Step A7).

Thus, in the wireless communication network system according to the first exemplary embodiment of the present invention, the cost is calculated based on the wireless transmission capacity depending on the AMR control and an economical and efficient route in the wireless communication network is selected. As a result, by selecting the transmission route with high transmission efficiency, congestion of traffic can be avoided.

Figure 7:
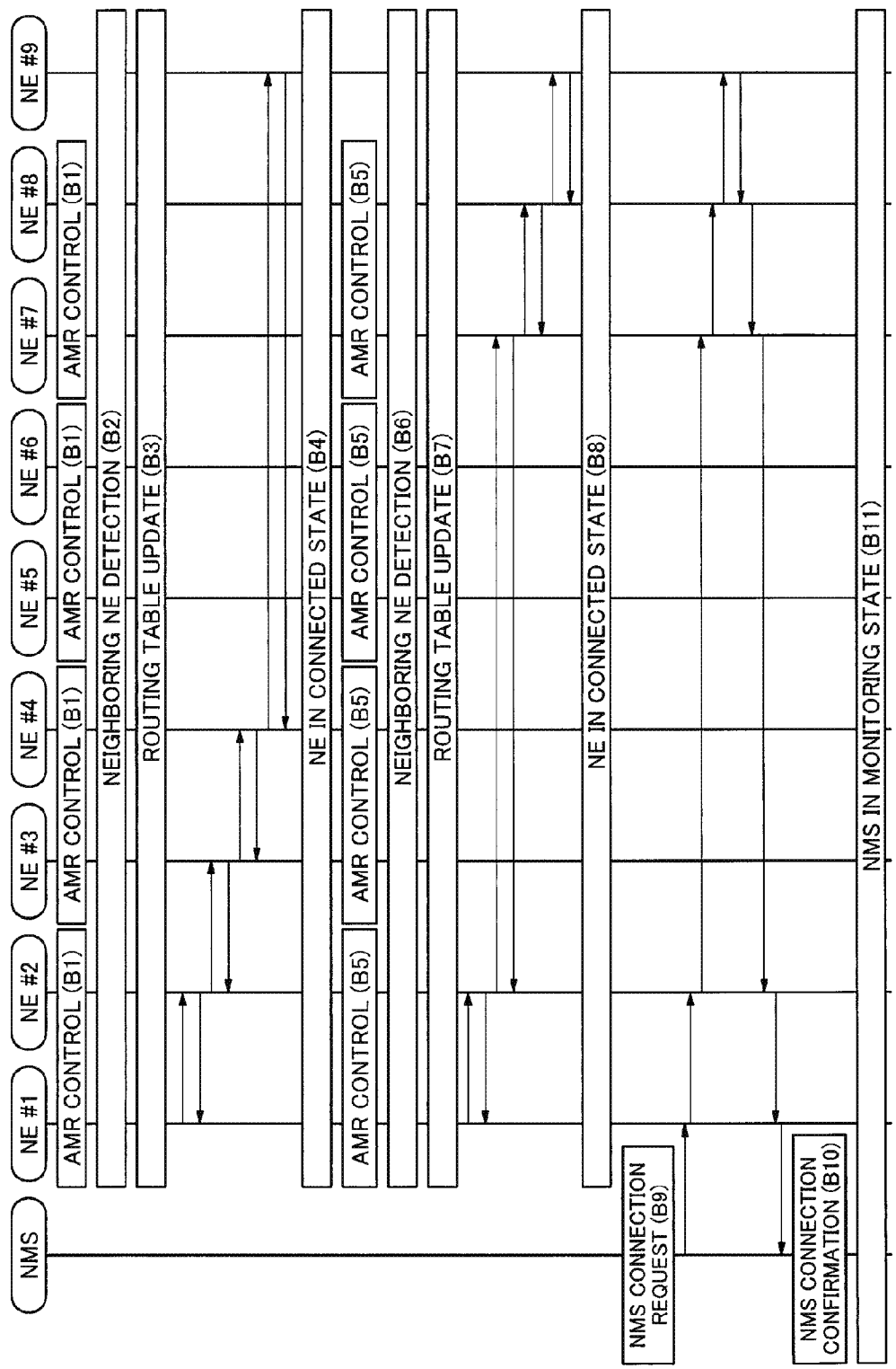

As for the first exemplary embodiment of the present invention, a case when route change occurs will be described. FIG. 7 is a route change sequence between NMS-NE when a route change occurs according to the first exemplary embodiment of the present invention. Explanation will be made with reference to the exemplary configuration of FIG. 1.

At first, the NMS 200 and each NE establish a connection by the same route as described in Steps A1-A4 of FIG. 6 mentioned above. In other words, the route established in Steps B1-B4 is in the order of NE#1, NE#2, NE#3, NE#4 and NE#9. After that, in the microwave communication system of NE's, change of the transmission rate depending on the AMR control due to changes in the weather and so on is performed at each route (Step B5). A case when changes in the wireless transmission capacity occur depending on the AMR control between each NE is as follows. After fixing the wireless transmission capacity between the opposing NE's, the routing cost of each wireless port of the NE is recalculated, the metrics is calculated (Step B6), and the routing table is updated (Step B7). After exchanging the route information based on the routing table between each NE, a connection between NE's is established (Step B8). In the example of FIG. 7, it is shown that the route after update is in the order of NE#1, NE#2, NE#7, NE#8 and NE#9. After that, same as the case described in FIG. 6, each NE which received the connection request from the NMS 200 refers to the routing table, performs route selection and establishes the connection with the NMS 200 (Steps B9 and 10). Accompanied by connection establishment between the NMS-NE's, monitoring and control become possible (Step B11).

Thus, in the wireless communication network system according to the first exemplary embodiment of the present invention, the most suitable route in the wireless communication network is selected after recalculating the cost according to the changes in the wireless transmission capacity depending on the AMR control and calculating the metrics again. As a result, by selecting the economical and efficient transmission route, congestion of traffic can be avoided.

The Second Exemplary Embodiment

Figure 8:
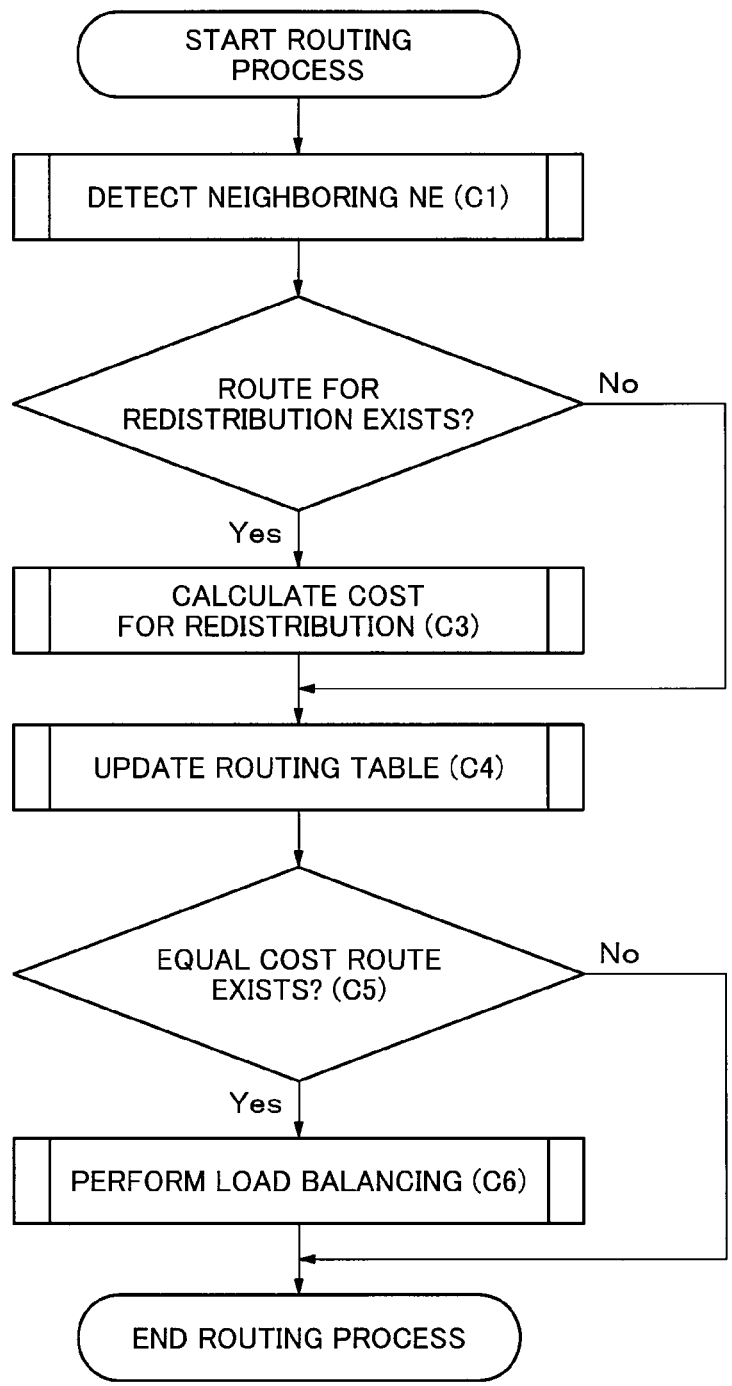

The second exemplary embodiment of the present invention will be described with reference to drawings. In FIG. 1, a block diagram of a microwave wireless communication network system according to the exemplary embodiment of the present invention is shown. Also, a structure of a mobile communication system according to the exemplary embodiment of the present invention is shown in FIG. 2. A routing process flow chart of an NE according to the exemplary embodiment of the present invention is shown in FIG. 8.

After fixing the wireless transmission capacity depending on the AMR control between opposing wireless NE's, the NE performs neighboring NE detection (Step C1). In case different routing protocols are mixed on a network route and redistribution of route information is needed, after performing calculation of the cost to be redistributed, a routing table is updated and an interoperability between the plurality of protocols is realized (Steps C2-4). In case a plurality of routes whose cost is equal exists as the routes between the sending source and the destination, load sharing of traffic is realized by composing a redundant route using the plurality of routes (Steps C5 and 6).

As a method of calculation of the cost when redistribution among the different routing protocols is performed, a numerical value of the cost may be handled with an identical unit, in other words, with an importance of the same level, and calculation may be made. Or, calculation of the cost may be made so that the cost is given weight between the different protocols. From this, for example, the cost of a network (internal network) with a route selection method using the AMR can be handled smaller than the cost of other external networks. This method is an effective method in such cases as the external network accounts for most parts of the routes, and in case it is required that handling of the external cost is given priority over the internal cost.

Thus, the wireless communication network system according to the second exemplary embodiment of the present invention performs the following operation. That is, in case different routing protocols are mixed on the network route, and redistribution of route information is needed, when the routing cost is calculated based on the wireless transmission capacity depending on the AMR control, the cost is given weight, the metrics is calculated, and redistribution is performed. As a result, an economical and efficient transmission route according to a policy of cost distribution can be selected.

Also, the wireless communication network system according to the second exemplary embodiment of the present invention performs the following operation. That is, in case a plurality of routes whose cost is equal exists as routes between the sending source and the destination, by composing a redundant route using the plurality of routes, and by realizing load sharing of traffic, congestion of the traffic can be avoided.

The Third Exemplary Embodiment

The third exemplary embodiment of the present invention will be described with reference to a drawing.

Figure 9:
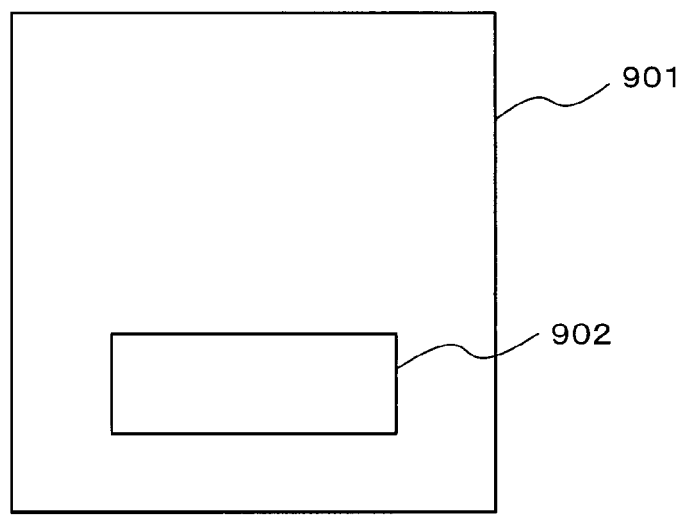

FIG. 9 is a block diagram of a wireless communication device according to the third exemplary embodiment of the present invention.

901 is the wireless communication device and 902 is a route selection means which, among a plurality of routes of a communication network, selects a route with larger transmission capacity as the route to communicate. In the wireless communication device according to the third exemplary embodiment of the present invention, cost is calculated based on the wireless transmission capacity depending on the AMR control, and an economical and efficient route in the wireless communication network is selected. As a result, by selecting the transmission route with high transmission efficiency, congestion of traffic can be avoided Further, the methods of calculation of the cost which have been described for each exemplary embodiment mentioned above indicate an example. As the method of calculation of the cost, other element than the wireless transmission capacity, for example, a CNR (Carrier to Noise Ratio), an RSL (Received Signal Level) a Syndrome error and so on may be used.

Also, in each exemplary embodiment described so far, a structure was made mainly assuming a wireless communication network which can be applied to a microwave wireless communication system. However, as far as it is a similar network which performs wireless communication within a relatively short distance, application to various wireless networks for other systems is also possible.

Also, in each exemplary embodiment described so far, although each NE which performs wireless communication in the wireless communication network is assumed to be a dedicated communication device, the following is also fine. That is, for example, a board or a card which perform communication processing corresponding to the wireless communication unit in this example are mounted on a personal computer device which performs various data processing, and communication control processing is carried out on the computer device side. In this way, by implementing software which carries out the communication control processing on the personal computer device, it may be structured so that temporary suspension processing of sending of a beacon signal and so on is carried out.

As for a program implemented on a data processing device such as the personal computer device, it may be distributed via various recording (memory) media such as optical disc and memory card. Or, it may be distributed via a communication means such as the internet.

Also, the exemplary embodiment mentioned above can be combined with other exemplary embodiments respectively.

Although the present invention has been described with reference to the exemplary embodiments above, the present invention is not limited to the exemplary embodiments mentioned above. To the composition of the present invention and details and within the scope of the present invention, various changes which a person skilled in the art can understand can be performed.

This application is based upon and claims the benefit of priority from Japanese Patent Application No. 2010-117095, filed on May 21, 2010, the disclosure of which is incorporated herein in its entirety by reference.

Although a part or all of the exemplary embodiments mentioned above can also be described as the following supplementary notes, they are not limited to the following.

Further Exemplary Embodiment 1

A route selection method in a communication network using a microwave communication system characterized by selecting a route with larger transmission capacity among a plurality of routes of said communication network.

Further Exemplary Embodiment 2

The route selection method according to Supplement 1, the route selection method characterized in that said transmission capacity on said communication network include said transmission capacity which depend on AMR control of the microwave communication system.

Further Exemplary Embodiment 3

The route selection method according to Supplement 2, the route selection method characterized by, in case a plurality of different route selection protocol are mixed on said communication network, a costs redistributed by said route selection protocol is given different weight between said costs which depend on said AMR control and said costs which depend on other than said AMR control.

Further Exemplary Embodiment 4

The route selection method according to Supplement 3, the route selection method characterized in that a redundant route is further composed by using a plurality of routes of which said cost is equal when said cost of a plurality of routes is equal.

Further Exemplary Embodiment 5

The route selection method according to Supplement 3 or Supplement 4,
the route selection method characterized by;
using a link state type as said route selection protocol of said communication network, and
including said transmission capacity on said communication network as metrics in calculation of said cost.

Further Exemplary Embodiment 6

A wireless communication device used for a communication network using a microwave communication system,
the wireless communication device characterized by comprising a route selection means for selecting a route with larger transmission capacity among a plurality of routes of said communication network.

Further Exemplary Embodiment 7

The wireless communication device according to Supplement 6,
the wireless communication device characterized in that said transmission capacity on said communication network include said transmission capacity which depend on AMR control of the microwave communication system.

Further Exemplary Embodiment 8

The wireless communication device according to Supplement 7,
the wireless communication device characterized by, in case a plurality of different route selection protocol are mixed on said communication network, a costs redistributed by said route selection protocol is given different weight between said costs which depend on said AMR control and said costs which depend on other than said AMR control.

Further Exemplary Embodiment 9

The wireless communication device according to Supplement 7,
the wireless communication device characterized in that a redundant route is further composed by using a plurality of routes of which said cost is equal when said cost of a plurality of routes is equal.

Further Exemplary Embodiment 10

The wireless communication device according to Supplement 8 or Further exemplary embodiment 9,
the wireless communication device characterized by;
using a link state type as said route selection protocol of said communication network; and
including said transmission capacity on said communication network as metrics in calculation of said cost.

Further Exemplary Embodiment 11

A wireless network route selection program of a wireless communication device characterized by realizing the route selection method according to any one of Supplement 1 to Supplement 5 as the program which can be executed on a computer.

INDUSTRIAL APPLICABILITY

The present invention relates to route control using AMR (Adaptive Modulation Radio) control of a wireless communication system in a wireless communication network system and has the industrial applicability.

REFERENCE SIGHS LIST

100 NE (Network Element)
110 IDU (Indoor Unit)

120 ODU (Outdoor Unit)
200 NMS (Network Management System)
300 Network
310 Network device

The invention claimed is:

1. A route selection method in a communication network using a microwave communication system comprising the steps of selecting a route with larger transmission capacity among a plurality of routes of said communication network,
   wherein said transmission capacity on said communication network includes said transmission capacity which depends on adaptive modulation radio (AMR) control of the microwave communication system, and
   wherein in case a plurality of different route section protocols are mixed on said communication network, a costs redistribution by said route selection protocol is given different weight between said costs which depend on said AMR control and said costs which depend on other than said AMR control.

2. The route selection method according to claim 1, wherein a redundant route is further composed by using a plurality of routes of which said cost is equal when said cost of a plurality of routes is equal.

3. The route selection method according to claim 1, the route selection method comprising:
   using a link state type as said route selection protocol of said communication network, and
   including said transmission capacity on said communication network as metrics in calculation of said cost.

4. A wireless communication device used for a communication network using a microwave communication system comprising a route selection unit that selects a route with larger transmission capacity among a plurality of routes of said communication network,
   wherein said transmission capacity on said communication network includes said transmission capacity which depends on adaptive modulation radio (AMR) control of the microwave communication system, and
   wherein in case a plurality of different route selection protocols are mixed on said communication network, a costs redistributed by said route selection protocol is given different weight between said costs which depend on said AMR control and said costs which depend on other than said AMR control.

5. The wireless communication device according to claim 4,
   wherein a redundant route is further composed by using a plurality of routes of which said cost is equal when said cost of a plurality of routes is equal.

6. The wireless communication device according to claim 4, wherein the wireless communication device:
   uses a link state type as said route selection protocol of said communication network; and
   includes said transmission capacity on said communication network as metrics in calculation of said cost.

* * * * *